United States Patent
Krämer et al.

(10) Patent No.: US 7,140,483 B2
(45) Date of Patent: Nov. 28, 2006

(54) TRANSMISSION PARKING BRAKE

(75) Inventors: Klaus Krämer, Baudenbach (DE);
Swen Dörrie, Herzogenaurach (DE)

(73) Assignee: INA Schaeffler KG (DE)

( * ) Notice: Subject to any disclaimer, the term of this patent is extended or adjusted under 35 U.S.C. 154(b) by 122 days.

(21) Appl. No.: 10/515,564

(22) PCT Filed: Apr. 26, 2003

(86) PCT No.: PCT/EP03/03982

§ 371 (c)(1),
(2), (4) Date: Nov. 22, 2004

(87) PCT Pub. No.: WO03/100299

PCT Pub. Date: Dec. 4, 2003

(65) Prior Publication Data
US 2005/0178638 A1    Aug. 18, 2005

(30) Foreign Application Priority Data
May 23, 2002 (DE) .............................. 102 22 718

(51) Int. Cl.
*B60T 1/06* (2006.01)
(52) U.S. Cl. .................. 192/219.4; 192/221; 188/31; 188/170
(58) Field of Classification Search .............. 192/219.4
See application file for complete search history.

(56) References Cited
U.S. PATENT DOCUMENTS 3,526,302 A * 9/1970 Grant et al. ................. 188/170

5,586,630 A * 12/1996 Orzal ........................ 192/221
6,234,289 B1 5/2001 Baker et al.
6,725,987 B1 * 4/2004 Koga ........................ 192/3.24

FOREIGN PATENT DOCUMENTS

| DE | 654 484 | 12/1937 |
|----|---------|---------|
| DE | 1 800 164 | 7/1970 |
| DE | 1 940 263 | 3/1971 |
| DE | 38 25 286 A1 | 9/1989 |
| DE | 43 33 787 A1 | 4/1994 |
| EP | 1 251 301 A2 | 10/2002 |
| WO | WO 97/14575 | 4/1997 |
| WO | WO 99/61296 | 12/1999 |

* cited by examiner

Primary Examiner—Richard M. Lorence
(74) Attorney, Agent, or Firm—Charles A. Muserlian

(57) ABSTRACT

A parking lock (1) of a transmission comprises a parking lock wheel (2) that is rotationally fixed relative to a shaft (25) and a locking ring (3) that is rotationally fixed relative to a housing (24), the locking ring (3) can be displaced axially into a positive locked connection with the parking lock wheel (2) by an engaging element (4) and can be released from the locked connection by a hydraulically actuated release element (6).

15 Claims, 2 Drawing Sheets

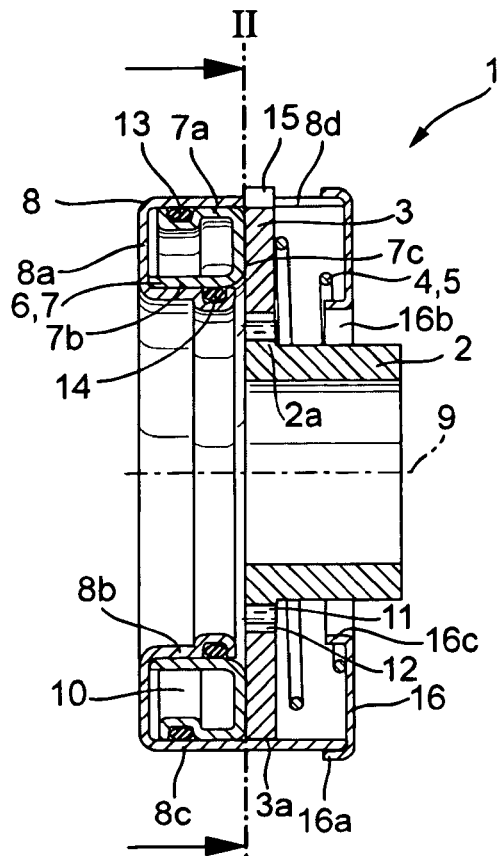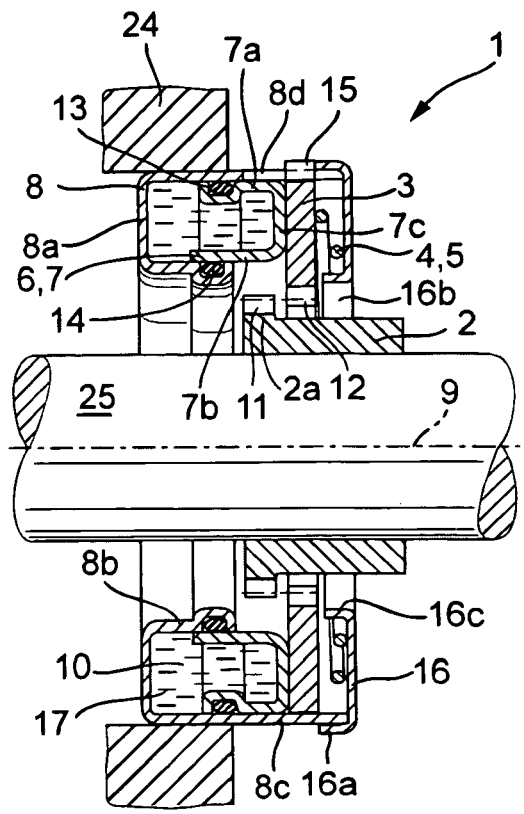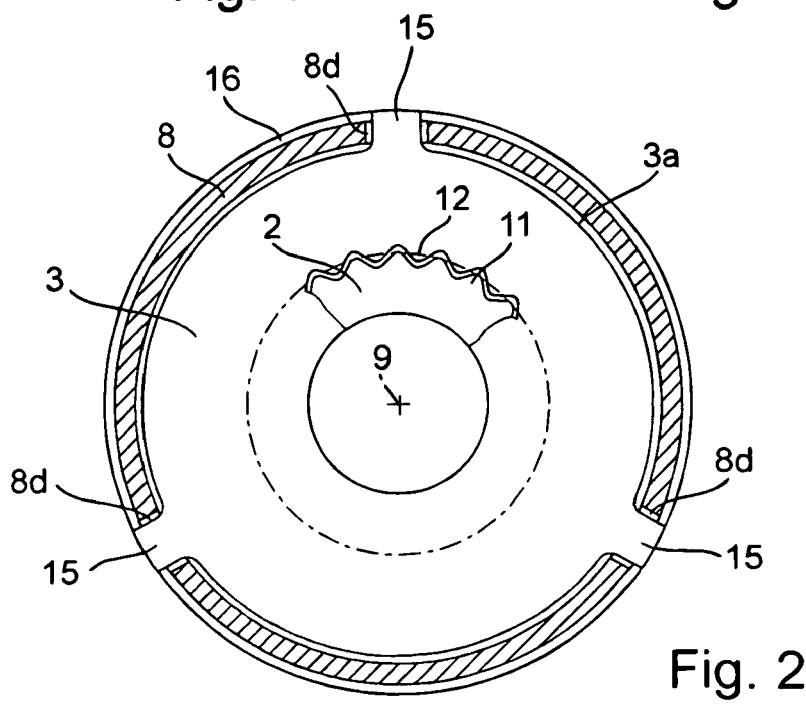
Fig. 1
Fig. 3
Fig. 2

TRANSMISSION PARKING BRAKE

This application is a continuation of PCT/EP03/03982 filed Apr. 16, 2004.

FIELD OF THE INVENTION

The invention concerns a parking lock of a transmission, typically an automotive vehicle transmission, the parking lock comprising:
- a parking lock wheel arranged concentrically with a central axis of a shaft while being fixed against axial and rotational movement relative to the shaft but rotatable with the shaft about the central axis of the shaft relative to a housing,
- a locking ring arranged concentrically with the central axis of the shaft for axial movement relative to the shaft and the housing but fixed against rotation about the central axis relative to the housing,
- an engaging element and a release element,
- the locking ring being able to be displaced axially by the engaging element into a positive locked connection with the parking lock wheel, so that the shaft can be locked relative to the housing against rotation about the central axis
- and the locking ring can be axially released out of the locked connection by the release element.

BACKGROUND OF THE INVENTION

DE 38 25 286 A1 describes a parking lock of the generic type. This parking lock comprises a parking lock wheel seated on a transmission shaft, a locking ring, a parking lock linkage used as an engaging element and a conical spring used as a release element. The parking lock wheel is seated concentrically with the central axis of the transmission shaft while being fixed in axial i.e. longitudinal direction and also fixed against rotation relative to the transmission shaft but rotatable with the transmission shaft relative to a housing of the transmission about the central axis. The locking ring is arranged concentrically with the central axis of the transmission shaft for axial movement relative to the housing and the transmission shaft but is fixed against rotation relative to the housing. The locking ring in this case forms a positive support connection with a housing by means of a support gearing. The support gearing engages into a housing-mounted counter support gearing that guides the locking ring rotationally fixed but axially movable relative to the housing. The locking ring and the parking lock wheel can be connected to each other to form a locked connection whereby the parking lock of the vehicle is in engaged condition. In this prior art, a counter locking gearing is configured on the parking lock wheel to match a locking gearing of the locking ring. The locking gearings are oriented toward each other and can be engaged with and released from each other. At least for the engagement of the locking gearing into the counter locking gearing, the engaging element engages the locking ring and pushes it against the force of the release element axially in the direction of the parking lock wheel till the locking gears mesh positively with each other. In the parking position, the gearings are meshed positively with each other whereby the locking ring and the parking lock wheel together form the locked connection. In this condition, the parking lock wheel and, with it, the shaft is retained with the help of the counter locking gearing rotationally fast relative to the housing on the locking gearing because the locking ring is supported rotationally fast on the housing through the support gearing. The locked connection is released again when the release element has pushed back the locking ring axially and the locking gearings are thus separated from each other. The costs for manufacturing the individual parts of this parking lock and for mounting them in the transmission are relatively high.

OBJECT OF THE INVENTION

It is an object of the invention to provide a parking lock that comprises a relatively small number of individual parts that can be economically manufactured and assembled.

This and other objects and advantages of the invention will become obvious from the following detailed description.

SUMMARY OF THE INVENTION

The invention achieves the above objects by the fact that the engaging element is at least one spring that biases the locking ring axially against the release element which is a piston that can be actuated by a hydraulic pressure medium, the locking ring can be disengaged axially from the locked connection through the pressure-medium actuated piston that can displace the locking ring against the biasing force of the spring. The locking ring is arranged in the parking lock axially between at least one or more springs on one side acting as engaging elements and a piston on the other side acting as a release element. During the driving operation, the locking ring is loaded by the piston. The hydraulically actuated piston retains the locking ring in a separated position from the parking lock wheel The parking lock wheel is freely rotatable with the transmission shaft about the central axis of the transmission shaft. The transmission shaft is not locked. The piston retains the locking ring in this position with a force that is at least greater than the force of the spring(s) biased against the locking ring and acting on the opposite side of the locking ring in the direction of the piston. The oil pressure acting on the piston is produced, for example, by an oil pump driven by the running engine of the vehicle. In the parking position of the transmission, the oil supply to the piston is cut off or the piston is free at least from the pressure of the hydraulic pressure medium. The spring force displaces the locking ring into the aforesaid positive locked connection with the parking lock wheel and displaces the depressurized oil at the same time, at least partially out of the pressure chamber of the piston unit. In the locked state, the spring continues to bear under pre-stress against the locking ring and thus maintains the locked connection. The transmission shaft is locked against rotation about its central axis.

According to a further proposition of the invention, the parking lock wheel comprises a first locking gearing and the locking ring comprises a second locking gearing that is oriented toward the first locking gearing and corresponds to the first locking gearing. The locked connection is thus established by a meshing of the second locking gearing disposed on the locking ring with the first locking gearing disposed on the parking lock wheel. The locking gearing of the parking lock wheel is preferably configured continuously on the entire outer periphery of the parking lock wheel, or only on portions thereof. The locking ring comprises a hole in which an inner gearing corresponding to the locking gearing of the parking lock wheel is arranged. The locking gearing of the locking ring can be displaced axially into a positive locked connection with the locking gearing provided on the outer periphery of the parking lock wheel. The locking gearing is preferably configured as a keyway gearing but it is also conceivable to use any other suitable types of gearings in the present arrangement.

Alternatively, the parking lock wheel comprises a circumferentially continuous or an interrupted counter locking gearing on a front end oriented toward the locking ring. A locking gearing configured on a front end of the locking ring and oriented toward the counter locking gearing of the parking lock wheel engages into the counter locking gearing. The locking ring displaced axially by the engaging element toward the parking lock wheel engages through the locking gearing frontally into the counter locking gearing on the parking lock wheel. The teeth in the embodiments of gearings described above are slightly beveled or rounded, for example, on the sides of the opposing tooth fronts to permit a better threading of the gearings into each other. The parking lock can become effective irrespective thereof even with a tooth-on-tooth position of the two locking gearings involved because the locking ring, and thus also the locking gearing on the locking ring, is biased against the locking gearing on the parking lock wheel by the force of the spring. A slight turning of the transmission shaft about its central axis with the parking lock wheel and its counter locking gear relative to the rotationally fixed locking gearing on the locking ring suffices to rotate the teeth against each other out of the tooth-on-tooth position till each tooth registers with a gap. The locking ring can then be pushed further into the locking position by the force of the spring when the teeth engage into a gap of the counter gearing.

To form the locked connection, it is possible to use any elements that can form a positive engagement with one another in peripheral direction of the parking lock wheel, e.g the elements of a dog clutch or entraining elements that are arranged on the periphery of one of the locking elements, or alternately on both locking elements, and engage into grooves or similar recesses.

According to a further proposition of the invention, the locking ring comprises a first support gearing, and the parking lock comprises a second support gearing that corresponds to the first support gearing. The locking ring engages with its support gearing into the counter support gearing fixed on the housing and is thus rotationally fixed through its support gearing to the housing while being axially displaceable relative to the shaft and the housing and at least guided in the counter support gearing. It is also conceivable that the locking ring be additionally supported radially and thus centered relative to the central axis of the transmission shaft in the counter support gearing. The flanks of the teeth of the gearings extend longitudinally of the central axis of the transmission shaft. The tooth gaps between the teeth of the gearing are oriented in a direction parallel to the central axis of the transmission shaft. In this way, due to the fact that teeth of the locking ring engage into the tooth gaps of the counter support ring, the locking ring is guided for axial displacement relative to the housing and the transmission shaft. The teeth of the housing-mounted support gearing are wider than the teeth of the support gearing on the locking ring in longitudinal direction of the transmission shaft. The width of the housing-mounted locking gearing is such that the locking ring is guided in the gearing for longitudinal displacement but rotationally fixed relative to the housing during its entire axial stroke that is determined by the engaging and the release operation.

In a further embodiment of the invention, in place of the support gearing, the parking lock comprises at least one groove that is delimited in peripheral direction of the locking ring on both sides and is open at least toward one entraining element disposed on the locking ring. The locking ring comprises an entraining element that engages into this groove. The groove extends parallel to the central axis of the shaft, and the length of the groove permits at least the stroke that is executed by the locking ring in axial direction for engaging into the locking gearing or for separating the locked connection. In peripheral direction, the locking ring is retained by the entraining element in the groove so as to be rotationally fixed relative to the housing. The entraining element extends, for example, radially outward from the locking ring and engages the transmission housing or a groove of a sleeve surrounding the parking lock. Preferably, at least two or three entraining elements are arranged in spaced relationship on the periphery of the locking ring, and each entraining element engages into one of said grooves.

The work and expense for the assembly of a parking lock by the transmission manufacturer is reduced if the parking lock is an assembled unit consisting at least of a guide sleeve, the locking ring, the piston and the spring. It is also conceivable to integrate the parking lock wheel into this assembled unit. The locking ring, the piston and the spring are lodged in the guide sleeve which advantageously has a cylindric configuration. The locking ring and the piston are guided for axial displacement in the guide sleeve. In addition, the locking ring is supported fixed against rotation relative to the housing in the guide sleeve. For this purpose, the guide sleeve is inserted or pressed into a suitable reception, for example a bore of the transmission housing, or it is flange-mounted on the transmission housing. The guide sleeve comprises either the longitudinal grooves for engagement by the entraining elements, or it comprises the counter support gearing for the support gearing on the locking ring, so that the locking ring is supported rotationally fixed in the guide sleeve but is guided for axial displacement therein. Such a guide sleeve is easy to mount. The parking lock has a compact structure and can be economically manufactured. After the insertion of the individual parts of the parking lock into the guide sleeve, the guide sleeve is closed preferably with a cover.

According to further features of the invention, the guide sleeve of the assembled unit comprises a pressure chamber for the hydraulic pressure medium, the pressure chamber is surrounded radially by legs of the piston which extend parallel to the central axis, the piston has an annular configuration and a U-shaped longitudinal section, the pressure chamber also being at least partially and intermittently surrounded by the guide sleeve. The pressure chamber is defined on one side by an annular bottom portion of the guide sleeve, and on the other side by the back of the bottom of the piston oriented toward the locking ring. Within the guide sleeve, the piston is guided for the most part in a cylindrical portion for axial displacement within its release stroke. The pressure chamber is sealed relative to the locking ring and the engaging element by at least one seal arranged between the piston and the guide sleeve. The seal is arranged concentrically with the central axis and is seated on the piston and on a cylindrical wall of the guide sleeve. Preferably, at least two seals are integrated in the parking lock, one of these seals, for example an O-ring, being seated on the periphery of the piston and the other being received on the outside on a cylindrical portion stamped axially from the bottom of the guide sleeve.

The individual parts of the guide sleeve are preferably made by shaping out of sheet metal and a machined finishing is generally not required. Thus, the guide sleeve and the piston are pressed or drawn parts of sheet metal. The locking ring is preferably made by punching and stamping out of sheet metal. The parking lock wheel is either a drawn, an extruded or a forged part. The anti-rotation device of the parking lock wheel relative to the transmission shaft is, for instance, a keyway gearing.

The invention will now be described more closely with reference to examples of embodiment illustrated in the appended drawings.

BRIEF DESCRIPTION OF THE DRAWINGS

FIG. 1 shows in longitudinal section, an example of embodiment of a parking lock in form of a pre-assembled unit, with the locking ring and the parking lock wheel in a locked connection with each other, FIG. 2 shows a cross-section of the parking lock of FIG. 1 along line II—II, FIG. 3, shows the parking lock of FIG. 1 in unlocked condition.

DETAILED DESCRIPTION OF THE DRAWINGS

Figure 4:
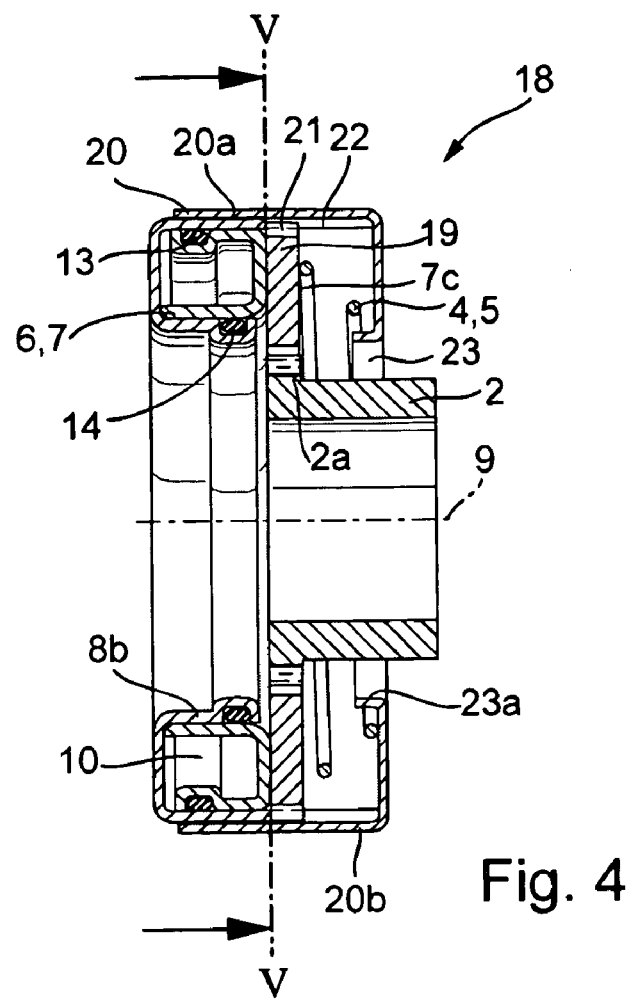
FIG. 4 is a further example of embodiment of a parking lock in form of a pre-assembled unit, represented in longitudinal section.

FIGS. 1 and 2 show a parking lock 1 comprising a parking lock wheel 2, a locking ring 3, an engaging element 4 in the form of a spring 5 and a release element 6 in the form of a piston 7. The individual parts of the parking lock 1 are combined into an assembled unit. For this purpose, the parking lock wheel 2, the locking ring 3 as also the piston 7 and the spring 5 are received in a guide sleeve 8. The guide sleeve 8 is a cup-shaped, drawn part of sheet metal having an annular bottom 8a from which a cylindric flange 8b extending parallel to the central axis 9 of a transmission shaft 25 is stamped into the guide sleeve 8. The piston 7 is received and guided for axial movement between the flange 8b and the cylindric wall 8c. The piston 7 is an annular drawn part of sheet metal that, as viewed in longitudinal section, has a U-shaped cross-section. The legs 7a and 7b of the piston 7 extend parallel to the central axis 9 and enclose a pressure chamber 10 in radially inward and radially outward direction. In axial direction, the pressure chamber 10 is defined on one side by the bottom 8a of the guide sleeve 8 and on the other side by a bottom 7c of the piston 7. Two seals 13 and 14 seal the pressure chamber 10 against loss of hydraulic pressure medium. The seal 13 in the form of an O-ring is seated in an annular groove formed into the leg 7a and is biased against the wall 8c. The seal 14 is seated in an annular groove formed into the flange 8b and is biased against the piston 7.

The locking ring 3 is a punched disk and comprises a locking gearing 12 on its inner periphery. Three entraining elements 15 extend radially outwards from the locking ring 3. Each entraining element 15 engages into a longitudinally extending groove 8d of the guide sleeve 8. By the entraining elements 15 extending into the grooves 8d, the locking ring 3 is secured on the guide sleeve 8 in peripheral direction against rotation about the central axis 9. At the same time, the locking ring 3 is supported through its outer periphery 3a with inner radial guidance on the guide sleeve 8. The spring 5 is a conical spring and is arranged concentrically with the central axis 9 in the guide sleeve 8. The opening of the guide sleeve 8 opposite the bottom 8a is closed with a cover 16. The cover 16 comprises an edge 16a which assures a firm seating of the cover 16 on the outer periphery of the guide sleeve 8. The cover 16 further comprises a through-hole 16b through which a collar 2a of the parking lock wheel 2 engages axially. A centering flange 16c is stamped from the edge of the through-hole 16b into the guide sleeve 8. The spring 5 is centered about the central axis 9 on the centering flange 16c.

In FIG. 1, the parking lock 1 is represented in a locked position. To achieve this, the locking ring 3 forms a locked connection with the parking lock wheel 2 through the locking gearing 12 which engages a counter locking gearing 11 on the parking lock wheel 2. This parking lock wheel 2 is seated firmly on the transmission shaft 25. A rotation of the transmission shaft 25, and thus of the parking lock wheel 2, about the central axis 9 is prevented by the fact that the locking ring is supported by the entraining elements 15 in peripheral direction in the grooves 8d. The spring 5 biases the locking ring 3 against the piston 7 and the axial limitation of the groove 8d and maintains the locked position of the parking lock 1. FIG. 3 shows the parking lock 1 during vehicle operation. The guide sleeve 8 and with it the parking lock 1 are seated as an assembled unit firmly in a housing 24 of the transmission. The pressure chamber 10 is filled with a hydraulic pressure medium 17. The pressurized piston 7 is displaced axially towards the cover 16 and displaces the locking ring 3 against the force of the spring 5 at least till the locking gearing 12 is released out of the counter locking gearing 11. The parking lock wheel 2 can rotate freely about the central axis 9 in the parking lock 1 together with the transmission shaft. Through the axial stroke of the piston 7, the pressure chamber 10 is enlarged so that the pressure chamber is peripherally defined partly by the wall 8c and the flange 8b of the guide sleeve 8 and partly by the legs 7a and 7b of the piston 7. When the pressure in the pressure chamber 10 is reduced, e. g. when the vehicle is shut off, the spring 5 displaces the locking ring 3, and with it the piston 7, into the locked position shown in FIG. 1.

Figure 5:
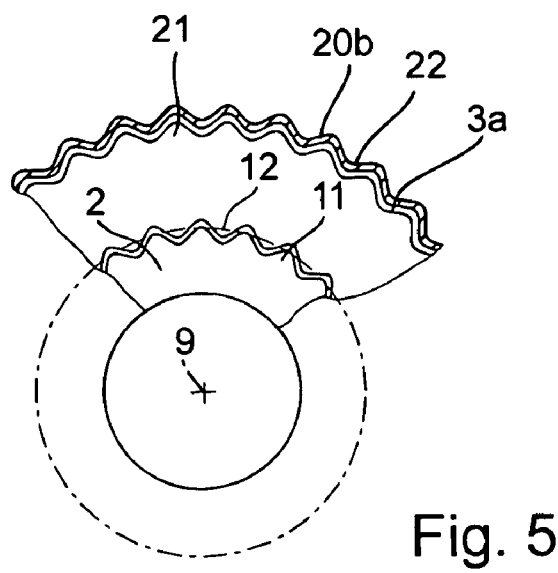
FIG. 5 is a cross-section of the parking lock of FIG. 4 along line V—V.

FIGS. 4 and 5 show a further example of embodiment of a parking lock 18 that, again, is combined into an assembled unit in which the parking lock wheel 2, the piston 7, a locking ring 19 and the spring 5 are received in a two-piece guide sleeve 20. This guide sleeve 20 comprises a guide section 20a and a support section 20b. The support section 20b is pressed onto the guide section 20a. The locking ring 19 comprises the locking gearing 12 and a support gearing 21. With this support gearing 21 extending on its outer periphery, the locking ring 19 engages into a corresponding counter support gearing 22 on the support section 20b. The guide sleeve 20 is arranged rotationally fixed relative to a transmission housing, not shown. The locking ring 19 is thus supported on the housing secured against rotation about the central axis 9. The width of the individual teeth of the counter support gearing 22 permits at least the stroke that is executed in axial direction by the locking ring 19 for activating and deactivating the parking lock 18. The guide section 20a of the guide sleeve 20 comprises a through-hole 23 through which the collar 2a of the parking lock wheel extends axially. A centering flange 23a is configured on the edge of the through-bore 23. The spring 5 is centered radially about the central axis 9 on the centering flange.

What is claimed is:

1. A parking lock of a transmission, said parking lock comprising
a parking lock wheel arranged concentrically with a central axis of a shaft while being fixed against axial and rotational movement relative to the shaft but rotatable with the shaft about the central axis of the shaft relative to a housing, a locking ring arranged concentrically with the central axis of the shaft for axial movement relative to the shaft and the housing but fixed against rotation about the central axis relative to the housing, an engaging element and a release element, the locking ring being able to be displaced axially by the engaging element into a positive locked connection with the parking lock wheel, so that the shaft can be locked relative to the housing against rotation about the central axis and the locking ring can be axially released out of the locked connection by the release element wherein the engaging element is at least one spring that biases the locking ring axially against the release element which is a piston that can be actuated by a hydraulic pressure medium, the locking ring can be disengaged axially from the locked connection through the piston actuated by the pressure medium so that the locking ring can be displaced against the biasing force of the spring, the parking lock wheel comprises a first locking gearing and the locking ring comprises a second locking gearing that is oriented toward the first locking gearing and corresponds to the first locking gearing, and the locked connection can be established by an engagement of the second locking gearing into the first locking gearing, the first locking gearing is configured continuously about the central axis on an outer periphery of the parking lock wheel, and the second locking gearing extends about the central axis on an inner periphery of the locking ring.

2. A parking lock of claim 1, wherein the locking ring comprises a first support gearing, and the parking lock comprises a second support gearing that corresponds to the first support gearing, the locking ring is rotationally fixed relative to the housing by the first support gearing and is axially displaceable relative to the shaft and the housing while being at least guided in the second support gearing.

3. A parking lock of claim 1, wherein the parking lock comprises at least one groove that is delimited on both sides in peripheral direction of the locking ring and is open at least toward one entraining element disposed on the locking ring, the entraining element extends from the locking ring into the groove and is axially displaceable in the groove, the locking ring is rotationally fixed relative to the housing by the entraining element and is axially displaceable relative to the shaft and the housing while being guided in the groove.

4. A parking lock of claim 1, wherein the parking lock is an assembled unit comprising at least a guide sleeve, the locking ring, the piston and the spring, the guide sleeve lodges the locking ring, the piston and the spring, the locking ring and the piston are guided for axial displacement in the guide sleeve, and the locking ring is supported fixed against rotation relative to the housing in the guide sleeve.

5. A parking lock of claim 4, wherein the guide sleeve comprises, at least one axial opening, the opening being closed by a cover comprising a through-hole for the shaft.

6. A parking lock of claim 4, wherein the guide sleeve comprises a pressure chamber for the hydraulic pressure medium, the pressure chamber is surrounded radially by legs of the piston which extend parallel to the central axis, the piston has an annular configuration and a U-shaped longitudinal section, the pressure chamber also being at least partially and intermittently surrounded by the guide sleeve, the pressure chamber being defined axially on one side by an annular bottom of the guide sleeve and on another side by a back of a bottom of the piston oriented toward the locking ring.

7. A parking lock of claim 6, wherein the parking lock comprises at least one seal arranged between the piston and the guide sleeve, the seal is arranged concentrically with the central axis and bears against the guide sleeve and the piston and thus seals the pressure chamber.

8. A parking lock of claim 4, wherein the guide sleeve and the piston are shaped parts made out of sheet metal.

9. A parking lock of claim 6, wherein the guide sleeve and the piston are shaped parts made out of sheet metal.

10. A parking lock of claim 1, wherein the locking ring is a punched and stamped part made of sheet metal.

11. A parking lock of claim 4, wherein the locking ring is a punched and stamped part made of sheet metal.

12. A parking lock of claim 6, wherein the locking ring is a punched and stamped part made of sheet metal.

13. A parking lock of claim 1, wherein the parking lock wheel is a shaped part.

14. A parking lock of claim 4, wherein the parking lock wheel is a shaped part.

15. A parking lock of claim 6, wherein the parking lock wheel is a shaped part.

* * * * *